Nov. 9, 1926.

C. JOANNIDES 1,606,705

PROCESS OF MANUFACTURING DENTAL RUBBER PLATES

Filed Feb. 16, 1922 4 Sheets-Sheet 1

Fig.1

Nov. 9, 1926.
1,606,705
C. JOANNIDES
PROCESS OF MANUFACTURING DENTAL RUBBER PLATES
Filed Feb. 16, 1922    4 Sheets-Sheet 3

Nov. 9, 1926. 1,606,705
C. JOANNIDES
PROCESS OF MANUFACTURING DENTAL RUBBER PLATES
Filed Feb. 16, 1922 4 Sheets-Sheet 4

Patented Nov. 9, 1926.

1,606,705

UNITED STATES PATENT OFFICE.

CHRISTE JOANNIDES, OF CONSTANTINOPLE, TURKEY.

PROCESS OF MANUFACTURING DENTAL RUBBER PLATES.

Application filed February 16, 1922, Serial No. 536,926, and in Great Britain December 31, 1919.

This invention relates to an improved system for the production of dental plates.

In the ordinary way of making dental rubber plates the form to be given to the plate is made from wax which corresponds to the form and thickness to be given to the rubber plate on which the teeth are fixed.

The model thus prepared with wax is fixed by means of plaster in the lower part of a two compartment flask. Before however the plaster is completely set it is carefully trimmed, and so prepared as to be free from undercuts which otherwise will hook the reverse part of the mould and break the plaster when separating same.

A separating agent such as soap or oil is used to prevent the two parts of the mould sticking or engaging together. The reverse part of the mould is then filled with plaster and allowed to set.

This method of flasking in a two part mould, apart from the fact that it is a long and difficult operation has also the great disadvantages (especially in cases where the lower model has pronounced undercuts and curvature of the ridge) of increasing the difficulties of flasking.

In order to prevent in many cases the reverse part of the mould becoming locked, wax is added to eliminate the undercut. This whilst it facilitates the separation of the mould, has the great disadvantage of causing porosity of the plate, due to the extra thickness of the rubber, which after vulcanization on filing the plate exposes the porous part of same. If on the other hand this precaution is not taken, the ridge of the plaster holding the teeth in position in the lower part of the flask will break away on separating the two halves of the mould, and eventually displacement of the teeth and other consequences will result therefrom.

The form of the plaster holding the teeth is made tapered and the lingual part of the teeth is left free from plaster, to allow the reverse part of the mould to be easily removed. This tapered form given to the plaster weakens its edges, predisposing same to break away and become mixed with the rubber during the packing process. If, on the contrary, the part is made less tapered or overhanging the lingual part of the teeth will break away when opening the flask.

It is to be noticed that with this method only the occlusal, or cutting part of the teeth is allowed to be covered with plaster to prevent overhanging undercuts, and also to give an easy access to the teeth for the packing of the rubber, but this greatly reduces the holding of the teeth, especially those of short bite.

After the plaster of the reverse part of the mould is prepared and set, the flask is placed in a pan or heater for the removal of the wax prior to the packing of the rubber.

The wax is removed by boiling the flask, separating the two halves, and scalding out with boiling water. This operation is sometimes found to be insufficient if not properly effected, as wax remains in or around the necks of the teeth, and to clean it properly cotton wool has to be used, saturated with alcohol, chloroform or the like. Owing to the porosity of the plaster when heated in boiling and scalding out the wax, the same is absorbed more or less by the plaster to the detriment of the rubber plate after vulcanization.

To remove any trace of the wax remaining, soda is also used at times, but this has a detrimental effect on the plaster. All these operations cause an appreciable loss of time.

If the wax is not properly removed, it will affect the rubber and consequently the holding of the teeth. In addition owing to the insufficient holding of the teeth to it by the plaster, as previously stated, they are liable to become displaced in boiling out the wax, and there is great difficulty in detecting their respective positions, especially if the forms of the teeth are such that they do not show sufficiently marked differences.

Another method for separating the flask is by the application of dry heat to soften the wax inside the mould, this not only weakens the plaster by making it friable, but causes it to absorb the wax, and when vulcanization is effected, the action of the steam heat of vulcanization, tends to free the wax from the plaster to the detriment of the rubber plate.

The next step is the packing process which is carried out by cutting small pieces of pink rubber (if the case requires it) packed between the necks and front part of the teeth, after the rubber has first been softened on a heater, or on a heated flask, and then the base rubber is packed in the same manner to form the plate.

The packing process in small pieces occupies a considerable time, and the teeth are liable to be displaced when packing, and the base rubber be mixed with the pink, especially at the parts where more pressure of the base rubber is exerted.

The displacement occurs owing to the pink rubber being packed in small pieces, involving a break of continuity and of uneven thickness, and whilst the rubber has sticking properties, yet it cannot have the same resistance which it has when in one piece and is of the same thickness.

Repeated operations, care and skilled mechanics are necessary to pack the case and to ascertain whether the flask is packed or not, as there are cases in which owing to the insufficiency of space, great difficulty arises in packing the rubber without breaking the plaster and getting it mixed with the rubber. There is also the risk by defective packing, of leaving unpacked places which would allow the rubber to expand during vulcanization, causing porosity, or a defective place.

It is obvious that in packing in the usual way in a two part mould, proper packing cannot always be assured.

After packing of the mould, the flask is boiled and pressed, and through the pressure exerted for closing the flask the rubber compresses the plaster with a breaking effect on the mould, due to the fact that the rubber under the action of boiling water does not lose its elastic tenacity sufficiently and very often breaks and forces the exposed edges of the plaster into the rubber. This has a more detrimental effect when gum sections are used, as the pressure of the rubber has the tendency to separate the sections, showing after vulcanization the space filled with rubber.

The teeth are also liable to be broken off by the pressure of the rubber especially the front teeth, if sufficient care is not taken.

Owing to the compression of the plaster by the rubber after vulcanization the rubber plate very often becomes thicker than that given by the wax plate, and this affects the bite and causes misfit of the plate. To correct this, the teeth have to be ground and repolished. The grinding of the teeth reduces their strength and deforms their shape.

There is another way of flasking called the reverse or indirect method, which has similar disadvantages and in addition, the raising of the bite. The scope of the present invention is to provide means to improve the manufacture of dental plates, by improving the different steps.

One object of the invention is to provide means to facilitate the flasking operations, and to overcome the necessity of using two part mould.

Another object of the invention is to scour out or discharge the wax without opening the mould or separating and exposing the teeth.

A further object of the invention is to provide means whereby the compression of the mould, disturbance of the teeth and defective filling is overcome.

With these main objects in view and as hereinafter described and claimed, and with many others which are incidental thereto, the invention consists in the provision of means whereby a vulcanized dental plate is produced after the wax model is embedded in the plaster without opening the flask or separating the mould.

The invention further consists in the provision of means whereby after the injection of the rubber or similar material into the mould vulcanization is followed without opening the boiler or removing the flask.

The invention further consists in the provision of means for enclosing the wax model to form the plate in a single block of plaster thus overcoming the necessity to separate or open the mould during the removal of the wax or filling of same.

The invention also consists in the provision of means whereby the wax from the mould is discharged or scoured or blown out by causing hot water to pass through into the mould, without opening the flask, or opening the mould, or exposing the teeth.

The invention more specifically consists in the provision of means whereby after the wax is eliminated from the mould, rubber or similar material capable of becoming plastic by heat is injected into the mould while the flask is under the action of steam pressure, the filling of which is controlled in that state without opening the boiler.

By this improved process the great loss of time and failure also arising from a two part mould is overcome by enclosing the wax model in a single block of plaster or practically so, which also has the additional advantage of overcoming the necessity of using a separate flask for each case, the method permitting more than one plate to be enclosed in one flask.

This system of flasking in one block of plaster holds the teeth much better, due to the fact that the whole of the lingual part of the teeth is embedded in the plaster without any break of continuity in the same.

The objectionable operation of cleaning the wax by boiling water in the usual way not only has the disadvantages mentioned, but it is difficult to keep the hands of the operator clean, this being very essential for the subsequent operation of packing the rubber.

These disadvantages are completely eliminated by causing a stream of hot water or steam or both to circulate through the mould by any suitable means, thus cleaning same in a perfect manner and leaving it free from wax much better and in less time than it is possible by the usual way of cleaning with a two part mould. Thus the time taken to clean the wax is reduced to the minimum. The method also allows in addition the discharging of more than one case in the same operation, at the same time and in one flask. A particular advantage is the scouring out of the wax when the flask is under steam pressure as the pressure of the steam is transmitted from the periphery or external parts to the centre of the mould, thus preventing the absorption of the wax by the plaster.

The packing process is also an operation which is one of the most annoying and difficult and requires as previously stated a skilled mechanic and considerable time for properly packing the plate; moreover even then there are many cases where the mould does not offer any easy access for the packing of the rubber, thus causing doubtful results.

By this process not only is the injected material in a perfectly plastic condition through the action of the steam heat but there is also the provision of means whereby the proper filling of the mould can be assured while the apparatus is under steam pressure and there is the further advantage that filling of more than one plate can be carried out in one flask, on account of the mould in the flask being under the influence of the steam, and heating the mould evenly in all its parts to such a degree, that the rubber once injected penetrates to the most intricate parts of the mould, without exerting pressure which would involve displacement of the teeth, or damage to the mould.

The vulcanization process also is one which requires great care, as it is difficult to obtain always satisfactory results. The successful vulcanization of a plate depends upon the conditions under which the vulcanization process is carried out. In order to obtain satisfactory results, a dental plate must be vulcanized under the same condition, that is to say, the space occupied by the flask must be always the same, as well as the quantity of water.

Owing to the provision of filling the mould without opening the same, the process according to this invention permits making the plaster model in one piece which also allows one or more cases to be enclosed in a single block of plaster. Consequently more than one case can be vulcanized in the same conditions giving the same result.

Whereas in the ordinary way, three sets of teeth would occupy a vertical height of three flasks, so that there would be a substantial difference in conductivity of heat, for the bottom and top flask, to the detriment of the upper flask. In some cases however a higher flask may be used if extra plates are to be produced.

The space occupied by the flask has an effect upon the vulcanization, as if a vulcanizer for two flasks is used for one, a different internal pressure is set up than is the case when using two flasks.

The production of dental plates according to the invention may be said to be divided mainly into four steps, each step having great advantages over existing methods, the best results being obtained when used in combination.

First. The teeth fixed in the wax are embedded in the plaster in a single block inside the flask, forming a seamless mould and not in two or more parts as is usual which method exposes the teeth.

Second. The operation of discharging or scouring the mould which can be obtained in different ways by any suitable means, is carried out without opening the flask or the mould.

Third. The operation of feeding the mould, which is effected by injecting the rubber or similar material, into one or more moulds, and means whereby the filling is controlled while the flask inside the boiler is under steam pressure.

Fourth. The operation of vulcanizing after the injection of the material.

The invention will now be described with reference to the accompanying drawings by way of example, embodying an apparatus in which all the operations can be carried out in combination or otherwise if desired, in which:—

Fig. 2 is a vertical longitudinal section thereof.

Fig. 2$^a$ is fragmentary view illustrating the fixing device for the lid of the flask.

Figure 1:
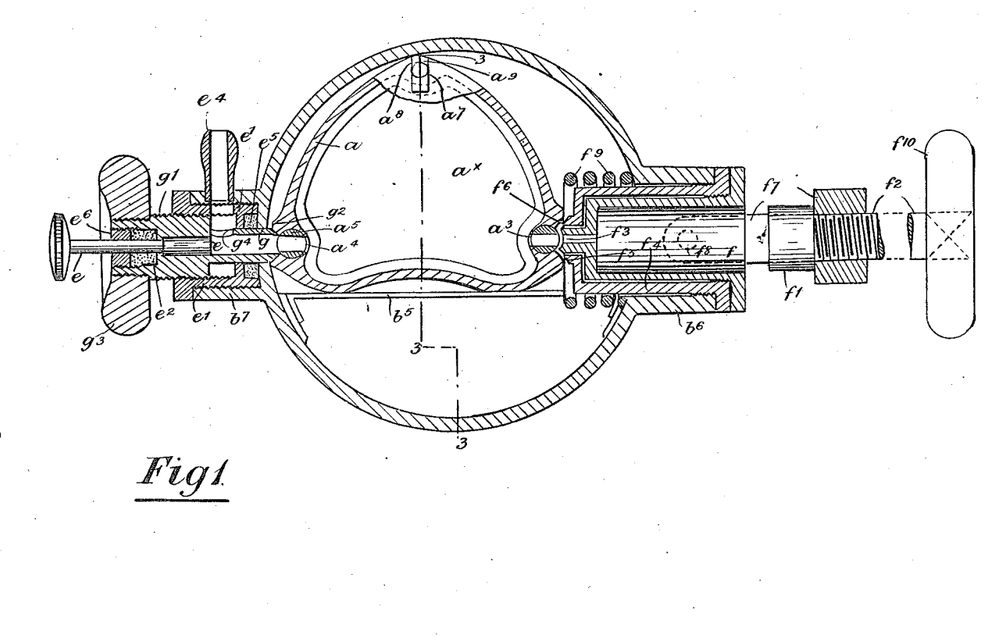
Fig. 1 is a horizontal section of one of my preferred forms of the said apparatus, in which the inlet and outlet are opposite each other.
Figures 2, 2A:
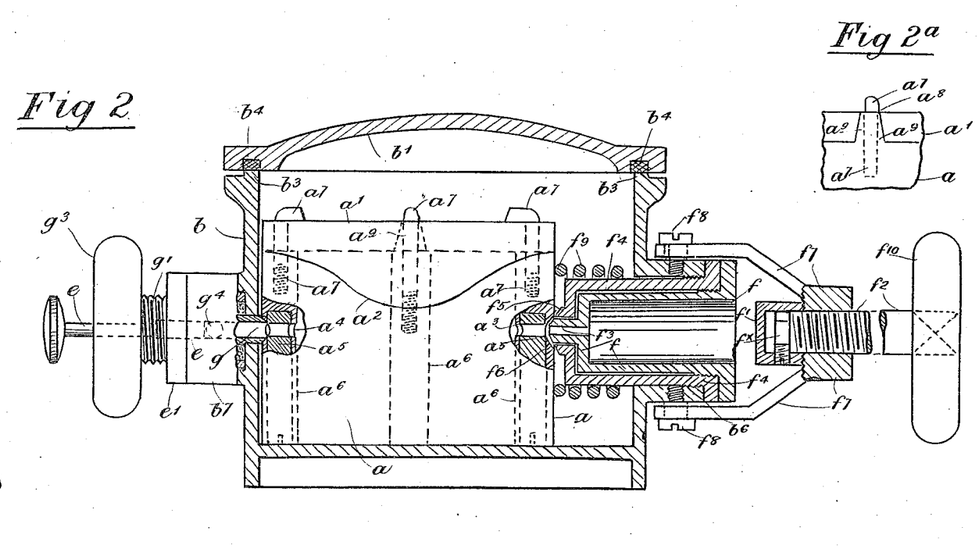
Figure 3:
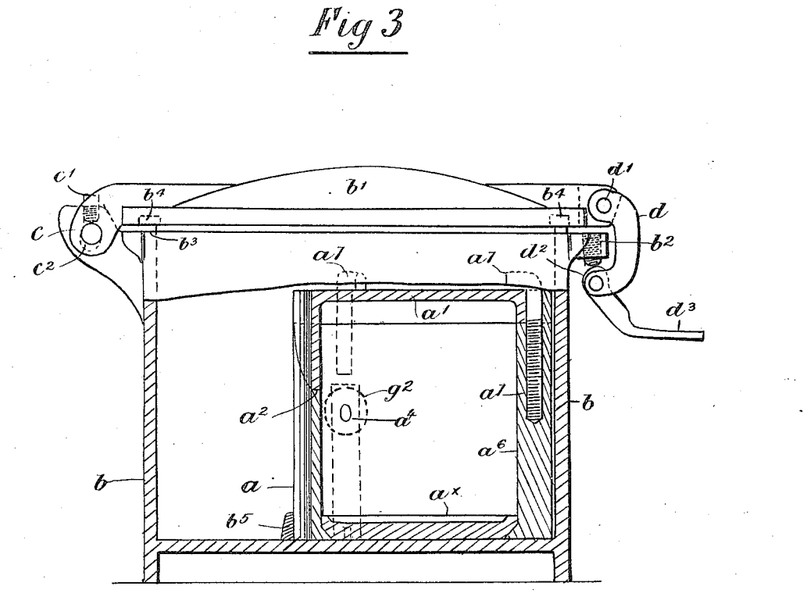
Fig. 3 is a transverse section in the line 3—3 of Fig. 1, the upper part however being in side elevation.

Referring more particularly to Figs. 1 to 3. $a$ is the moulding flask, which as shown is three cornered and is shaped somewhat like the letter D, its circumferential or segmental convex part being curved approximately to the shape of the jaw. It is provided with a removable bottom $a^x$ and a detachable lid or cover $a^1$, which at the concave side (see Fig. 1.) has a curved flange extending down as at $a^2$ (Fig. 2) so that when it is removed, the interior is more accessible to the fingers of the operator from that side especially for sticking the wax wires on the model.

This flask is fitted in the boiler or heater $b$ which has a lid or cover $b^1$ hinged at $c$ and provided with safety valve (not shown) and a locking or clamping device for fixing it down tightly. In the present instance this locking device comprises a movable piece or loop $d$ with its top end hinged at $d^1$ to a projection on the edge of the cover. At its lower end the loop $d$ carries an eccentric or cam-shaped piece $d^2$ provided with a lever $d^3$ for turning it. This cam is adapted to bear against an adjustable screw pin $b^2$ in a projection of the flange of the heater $b$, and by this means a very powerful closing pressure can be applied to the lid. Said pressure can however be instantly released by turning the cam lever $d^3$ in the counter direction, and then the loop $d$ can be turned back out of the way to allow the lid or cover $b^1$ to be opened.

The body $b$ of the boiler has an upstanding rim $b^3$ which abuts against a packing ring $b^4$ let into the lid $b^1$, and thus renders the boiler steam tight when the lid is closed.

To assist this action the pivot or hinge pin $c$ can itself be further screwed down by a set screw $c^1$, the hole in which the pin $c$ fits is deepened as in dotted lines at $c^2$ to permit of such downward movement. In this way the side of the lid $b^1$ opposite the fastening device can be given an extra compression to further ensure proper steam tightness all round.

In addition to this, to facilitate the placing of the flask in position a strip or ledge $b^5$ is provided across the bottom of the boiler so that the flask will just fit easily between it and the shell of the boiler, as indicated in Fig. 1.

The flask has an inlet opening $a^3$ and an outlet $a^4$. Each of these openings or orifices $a^3$ $a^4$ is controlled by a rotary plug or tap $a^5$ fitted in a thickened part or hollow vertical rib $a^6$ in the wall or shell of the flask.

There is one such rib in each of the three corners of the flask and they serve also to receive the screw devices $a^7$, by which the lid $a^1$ is clamped down on to the body part $a$ of the flask. These devices $a^7$ are bent or hooked over at the top, and pass through slots or gaps $a^8$ in the corners of the lid. On the edge of the flask (see Fig. 2ª) are upstanding projections or teeth $a^2$, which fit in and close these slots or gaps, and act as supports or stiffeners for the tops of the screw hooks $a^7$. It will be noticed that there is a screw $a^7$ above both the inlet and outlet, and these have been found to be effectual in withstanding the internal pressure in the flask. Furthermore opposite the outlet orifice $a^4$ is provided a movable plug or wire $e$ serving to indicate as hereinafter described that the flask is filled. The inlet orifice viz $a^3$ is intended to serve for the entry of hot water and steam into the flask as well as for the introduction of the rubber, whilst the outlet $a^4$ serves for the escape of the wax, steam and water, as well as for the aforesaid signal wire, pin or indicator plug $e$ which by being pushed back outward therefrom shows when the flask is filled with rubber.

At the first or inlet orifice $a^3$ is situated the charging cylinder or pump $f$ for the forcing in of the rubber, and opposite this orifice (viz at the other side of the flask where the orifice $a^4$ is situated) is a tubular pressure piece or supporting plug $g$ to fix or clamp the flask in position.

The charging cylinder or injector pump $f$ is provided with a piston $f^1$ and screw plunger $f^2$ to force the contents through the nozzle $f^3$ into the inlet $a^3$ of the moulding flask. The said piston $f^1$ is free to turn on the end of the screw, and is connected therewith by a pin and groove connection $f^x$.

The aforesaid plunger or feed screw $f^2$ is provided with a knob or hand wheel $f^{10}$ and is mounted in a yoke piece $f^7$ pivoted at $f^8$, which can be swung downwards to leave the cylinder $f$ open when required. Said injector cylinder $f$ is also provided with a casing, jacket $t^1$ or sleeve $f^4$ into which it is screwed as shown. The said casing can be omitted when the boiler is intended to be used for packing only, and not as a vulcanizer. The flanges of the cylinder $f$ and casing or jacket $f^4$ are provided with washers to secure tight joints. The casing $f^4$ is fitted or screwed into a tubular projection or neck $b^6$ on the shell or casing of the heating chamber or boiler $b$, and has a nozzle $f^5$ tapered or bevelled to fit in a funnel or mouth piece $f^6$ round the inlet aperture $a^3$. Moreover an annular steam space is left between $b^6$ and $f^4$ for jacketing purposes. In addition to this around the sleeve or cylinder $f^4$ is fitted a fairly powerful coiled spring $f^9$. The said spring serves to press against the adjacent corner of the flask and force the latter slightly away from the charging cylinder when the screw $g$ at the opposite side is slacked back, thus opening the aperture $a^3$ by withdrawing the mouth piece or funnel $f^6$ slightly from the concentric nozzles $f^3$ $f^5$ as shown. Moreover, any other suitable arrangement may be made to open the aperture. At the opposite or outlet side, the boiler has another tubular projection or neck $b^7$ in which is screwed a liner or cylinder $e^1$. This liner has screwed into it a plug $g^1$ from which extends forward the tube or plug $g$ whose extremity projects into the boiler.

Said extremity is tapered or conical to fit in a funnel shaped mouth or seating $g^2$ round the outlet orifice $a^4$ analogous to the arrangement at the inlet orifice opposite.

The signal pin or indicator plug $e$ slides axially through the tubular plug $g$ $g^1$ and works in a stuffing box $e^2$ which keeps it steam tight. Another stuffing box $e^5$ in the front of the liner $e^1$ serves to keep the tube or plug $g$ steam tight, whilst a nipple or nozzle $e^4$ serves for the ultimate discharge of the wax, etc. Any suitable device such as a set screw may be used to fix the plug $e$ in its innermost position to close the outlet when vulcanizing for instance.

The said holding up screw plug $g$ is tubular and has a central passage as shown for the outflow of the wax and the water leading to the nipple $e^4$. It is also provided with the aforesaid signal or indicator pin, wire or plug $e$ which is adapted to be displaced by the red or base rubber composition and so warn the operator that the flask is full. This plug works in the stuffing box $e^2$ and the latter has an adjustable screw plug or gland $e^6$ to alter the pressure on the packing and so hold the pin or wire of the plug more or less tightly according to the pressure desired to be set up on the rubber in the flask. The plug can also be used to completely close the outlet $a^4$. Besides its longitudinal passage, the plug $g$ $g^1$ has a port or aperture $g^4$ leading to the nipple $e^4$ (which may be connected for instance to a suitable waste pipe as stated) and is provided with a knob or hand wheel $g^3$ for turning it.

The orifices of the flask may be provided with any suitable devices for closing them after removal of the flask from the boiler. In the example shown these devices $a^5$ are simply perforated plugs (acting like those of gas taps) fitted in the thicknened corners of the flask across the orifices, and in line with the screws $a^7$ for holding the cover $a^1$ in place.

Figure 5:
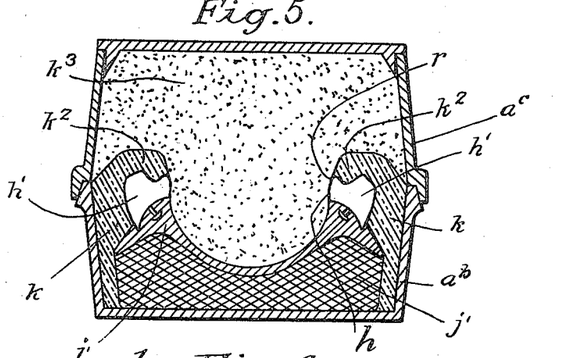
Fig. 5 is a vertical section of the usual system of the flasking of a two part mould.

Referring to Fig. 5 the usual two part flask comprises two parts, $a^b$ being the lower or base part and $a^c$ the reverse part. In the lower part of the flask, the plaster model $j^1$ is arranged in which the teeth $h^1$ are mounted as usual on the wax and held therein by means of plaster K and the overhanging plaster as shown at $K^2$, the part $r$ of the teeth is not covered by the plaster to avoid undercuts of the reversed part of the mould. This uncovered part of the teeth reduces the holding of same to the plaster whilst the edges of the overhanging part $k^2$ of the plaster and that between the teeth are liable to be broken off when packing the rubber.

Figure 6:
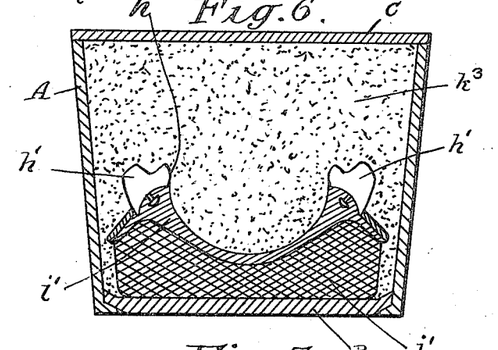
Fig. 6 is a similar section showing the improved system of flasking according to the present invention.
Figure 7:
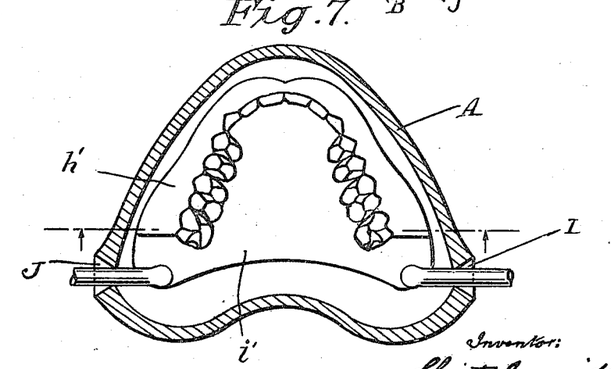
Fig. 7 is a horizontal cross section of Fig. 6.

Fig. 6 is a vertical section illustrating the improved type of flask and the model enclosed in a single block of plaster as $k^3$, and in which A is the flask having preferably one inlet and one outlet opening I, J, as in Figure 7 and a removable cover C and bottom B Figure 6. The plaster model $j^1$ carrying the teeth $h^1$ in the wax $i^1$ is inserted inside the flask in the position shown according to Fig. 2. Two wax wires connect the wax model to the inlet and outlet openings I, J, of the flask as in Figure 7. The whole of the flask if filled with the plaster as at $k^3$ Figure 6 and the cover kept in position thus forming a single block of plaster. As shown the part $r$ of the teeth is held entirely in the single block of plaster instead of being exposed as in the ordinary way which thus firmly holds the teeth in position. There are no seams liable to be broken off and incorporated in the plaster.

In the manufacture of a dental plate according to the invention the tough pink rubber facing may be first applied to the teeth and wax model and kneaded on to them with the fingers, or with hot instruments if desired. The model is then ready to be placed in a flask and embedded in the plaster.

Before however the flask is filled with plaster, fusible pieces, wires or rods are placed in the two orifices $a^3$ $a^4$ and extend to the end of the wax model.

After the flask is placed in the boiler and has become heated, these pieces melt and leave the apertures clear for the outflow of the wax, for the free passage of the hot water or steam to scour out the mould, and for the introduction of the base rubber composition, celluloid or the like.

The boiler or heater is made of such a capacity as to hold an ample quantity of water to keep the flask at the desired temperature.

When the wax model begins to melt and drip from the discharge nozzle $e^4$ the pressing screw or holding up plug $g^1$ is drawn back by turning the knob $g^3$ and the spring $f^6$ pushes back the flask slightly so that the steam or hot water can enter the now open orifice $a^3$ and displace the melted wax in the flask, the rush of such steam or water completely scouring out the mould and freeing it from any residual particles of wax. When this has been effected, the flask is again forced by the holding-up screw or plug $g$ against the cylinder nozzles $f^3$ $f^5$ so shutting off the water and steam spaces from the inlet $a^3$ ready for the forcing in of the red or base rubber by the piston or plunger.

After the mould is charged, the injector cylinder $f$ is unscrewed and drawn back, leaving the casing $f^4$ however still in position with its nozzle $f^5$ closing the funnel $f^6$ and preventing escape of steam from the boiler. A closing-plug of the same shape as $f^3$ but solid carried by a screw-block which fits the thread in the casing $f^4$, may then be inserted in its place to close the inlet $a^3$. The temperature of the boiler can then be raised as desired for the purpose of vulcanizing the plate in the flask without removing the latter from the boiler. The taps $a^5$ can be omitted in apparatus which is intended for vulcanizing in the way just described. Moreover any suitable means may be provided to turn the tap or taps $a^5$ from the outside whilst the flask is under steam pressure.

Owing to being able to expel the wax forcibly and thoroughly and to introduce the rubber mechanically in the manner referred to, it becomes possible to make the plaster mould all in one piece or block in the flask, instead of in two parts or halves. This enables the base rubber to be always formed to the exact thickness desired, viz, to the precise thickness of the wax, and any interference with the articulation or the setting of the teeth (owing to variation in thickness which may occur with two-part moulds) is avoided. Moreover there are no edges or seams, such as are liable to be broken off when filling or packing in of the composition, and hence fragments are not liable to become embedded in the latter, and damage the same. The employment of a safety valve in the lid or cover $b^1$ enables the pressure and temperature to be regulated easily and with certainty.

The same apparatus can also be used for celluloid work, the mode of taking out the wax being similar. The celluloid becomes softened in the cylinder by the heat of the apparatus and is then forced into the flask by means of the charging cylinder in the same way as the rubber.

Figure 4:
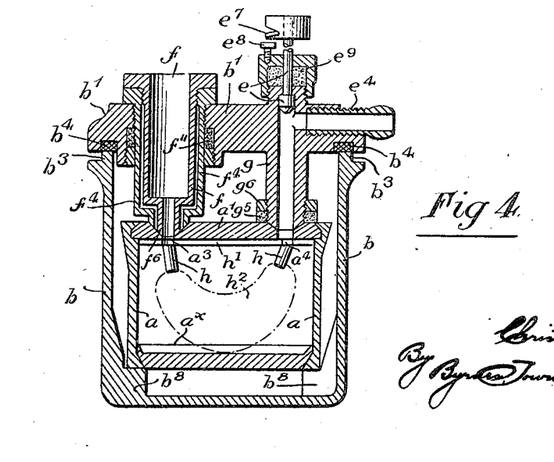
Fig. 4 shows a modified construction hereinafter mentioned in which the inlet and outlet are in the cover of the apparatus.

In the simplified modification shown in Fig. 4 the same letters of reference refer to corresponding parts. The spring $f^9$ is dispensed with and the orifices $a^3$, $a^4$, are formed in the top of the flask which is supported by rests or bearers $b^8$, in the bottom oft he boiler. The cover $a^1$, of the flask slides in dovetail grooves in the body thereof instead of having holding-down screws. The plug $g$ may be cast in one with the lid $b^1$ of the boiler, and the nipple $e^4$ may be secured in said lid. These arrangements dispense with most of the outlet parts at the left of Fig. 1. The arrangement may however be similar to that in Fig. 1, in which case, as the cover is held in position by the pressure of the outlet and inlet, the dovetail grooves are dispensed with and two pins are sufficient to determine the position of the cover.

To ensure a tight joint round the lower end of the outlet plug $g$, an adjustable packing ring $g^5$ and screw collar $g^6$, are provided, whereby the packing ring can be readily set in such a position that it will make an effective joint against the lid $a^1$ when the cover $b^1$ of the boiler is closed.

In this arrangement the piston $f^1$ can be forced in by a lever, as can also that in Fig. 1, if desired.

The casing or sheathing $f^4$, of the charging device works through a stuffing box $f^{11}$, and can be screwed down tight into the funnel or seating $f^6$. As the cover $a^1$, is a sliding one a special arrangement is provided for inserting the usual wax wires $h$ connected with the inlet and outlet orifices $a^3$, $a^4$. To this end these wires are secured as shown, to a metal strip or flat bar $h^1$, laid on top of the plaster and having holes corresponding to said orifices, thus holding the wires properly in place, ready for the cover to be slidden into position transversely across said strip $h^1$. The wax model into which the wax-wires $h^1$, lead, is indicated by the dotted line $h^2$.

The indicator rod $e$ in this case works through a stuffing box $e^9$, and is so arranged that in its innermost position its plug or inner end closes the outlet orifice $a^4$. To secure it in this position its knob has a curved or spiral slot $e^7$, adapted to engage or hook over a screw stud $e^8$, on the stuffing box, $e^9$, or other suitable arrangement.

In other respects the action of this arrangement resembles that first described. The injector piston $f^1$, (not shown) is arranged above the removable cylinder $f$ and when the latter is taken out after the charging of the mould with red or base rubber or the like, the orifice $a^3$, is closed by a screw plug adapted to screw into the casing or sheathing $f^4$, or by turning a tap which may be on the cover, from outside the boiler by any suitable means, whereupon the apparatus is ready to be used as vulcanizer simply by raising its temperature to the desired degree.

The flask $a$ can be constructed either for one or more cases, for example an upper and a lower set of teeth. For two cases, the models may be connected end to end by wax wires which after melting, leave a passage or passages through the plaster so that the material shall be forced first through one and then through the other case, or they may be connected in parallel between a single inlet and outlet. In fact as the filling of the rubber is easily controlled when the flask and cylinder are under steam pressure, and as the flask is uniformly heated throughout, it is feasible to fill two or more cases in one flask, as the rubber is fluid enough at the temperature of the flask to penetrate into the most intricate parts of the mould.

To ensure proper checking of the temperature, two thermometers may be used and be laid horizontally in grooves in the lid or cover of the boiler, one acting as a check on the other. Being in direct contact with the lid throughout their length they indicate more accurately than if arranged to be under the influence of the external temperature as in ordinary arrangements.

An apparatus such as above described greatly economizes time and avoids large vulcanizers, besides ensuring that the two or more cases are vulcanized under the same pressure and general conditions and attain the same degree of hardness.

Having now particularly described and ascertained the nature of my said invention and in what manner the same is to be performed, I declare that what I claim is:—

1. In a process for the production of dental plates by injecting rubber or other material capable of becoming plastic by heat, applying the imitation gum prior to the flasking operation.

2. In a process for the production of dental plates flasking more than one wax model to form the plate in a single block same being inter-connected by wax wires.

3. In a process for the production of dental plates flasking the wax model in a single block of plaster then scouring out the wax by causing a stream of hot water to pass through.

4. In a process for the production of dental plates flasking the wax model to form the plate in a single block of plaster then scouring out the wax by causing a stream of hot water and steam to pass through.

5. In a process for the production of dental plates flasking the wax model to form the plate in a single block of plaster then scouring out the wax by steam.

6. In a process for the production of dental plates in which after the flasking operation the flask containing the wax model to form the plate is inserted in the injecting apparatus whereby the wax is scoured out by causing hot water to pass through the mould and from the connected opening of the in jector boiler.

7. In a process for the production of dental plates by injecting rubber or other material capable of becoming plastic by heat into a mould while the flask is under steam pressure in the boiler scouring out the wax and injecting the material without opening the boiler.

In testimony whereof he has affixed his signature.

CHRISTE JOANNIDES.